United States Patent [19]

Newberry et al.

[11] Patent Number: 4,495,129

[45] Date of Patent: Jan. 22, 1985

[54] PROCESS FOR PRODUCING HIGH PRECISION APERTURES IN PLASTIC COMPONENTS

[75] Inventors: Alfred L. Newberry, Moore; Francis A. Lassak, Oklahoma City, both of Okla.

[73] Assignee: Magnetic Peripherals Incorporated, Minneapolis, Minn.

[21] Appl. No.: 529,300

[22] Filed: Sep. 6, 1983

[51] Int. Cl.³ .............................................. B29C 25/00
[52] U.S. Cl. .................................... 264/235; 264/154; 264/296; 264/346
[58] Field of Search ............... 264/234, 235, 345, 346, 264/154, 230, 320, 294, 296; 425/404, 446

[56] References Cited

U.S. PATENT DOCUMENTS

| | | | |
|---|---|---|---|
| 3,508,760 | 4/1970 | Woodling | 264/154 |
| 3,544,673 | 12/1970 | Inskeep, et al. | 264/294 |
| 3,562,199 | 2/1971 | Hill et al. | 260/37 |
| 3,582,521 | 6/1971 | Villa | 260/45.75 K |
| 3,656,233 | 4/1972 | Overholser | 29/629 |
| 3,725,337 | 4/1973 | Villa | 260/45.8 R |
| 3,878,113 | 4/1975 | Campbell et al. | 252/12 |
| 4,001,889 | 1/1977 | Schneider | 360/104 |
| 4,161,004 | 7/1979 | Dolziel | 360/106 |

Primary Examiner—Donald Czaja
Assistant Examiner—V. Fischbach
Attorney, Agent, or Firm—William J. McGinnis; Joseph A. Genovese

[57] ABSTRACT

A process for producing high precision apertures in plastic components comprises the steps of: injection molding the component from a crystalline or semicrystalline thermoplastic material wherein at least one aperture is formed in the component during the molding step; inserting an annealing rod having an oversized diameter with respect to the aperture into the aperture; placing the component, with the annealing rod inserted into the aperture, into an oven at an elevated temperature for a period of time; allowing the component to cool; and withdrawing the annealing rod from the aperture of the component.

4 Claims, 5 Drawing Figures

U.S. Patent  Jan. 22, 1985  4,495,129
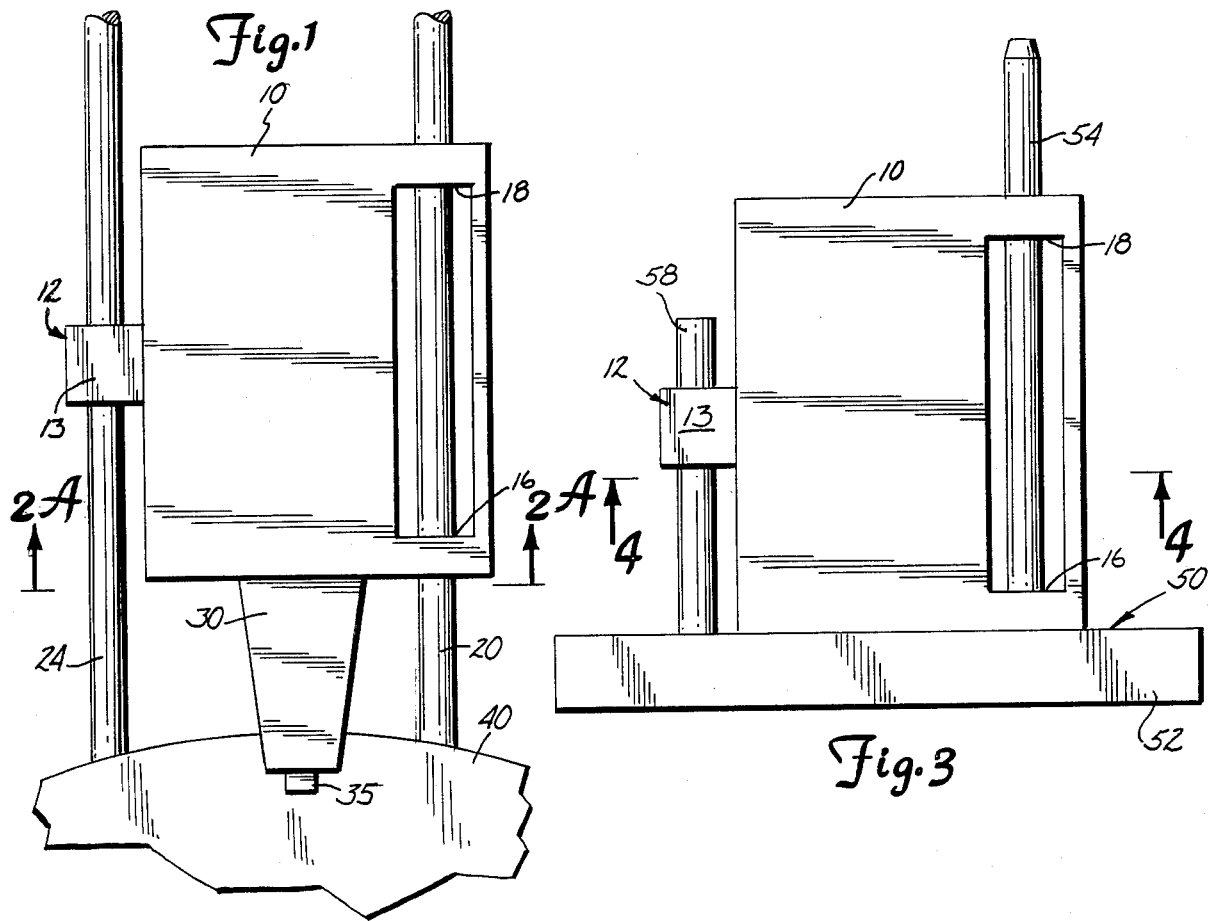
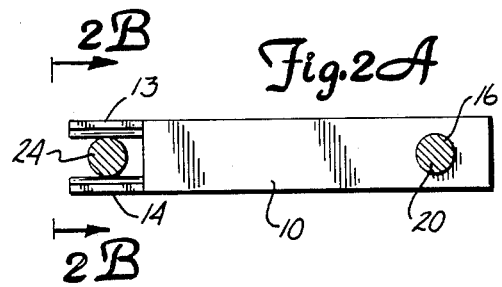
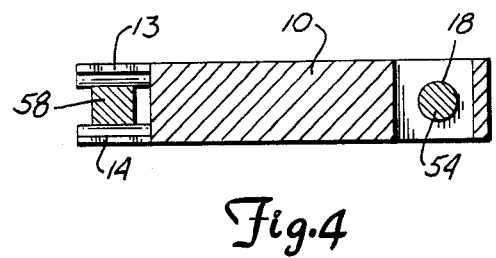
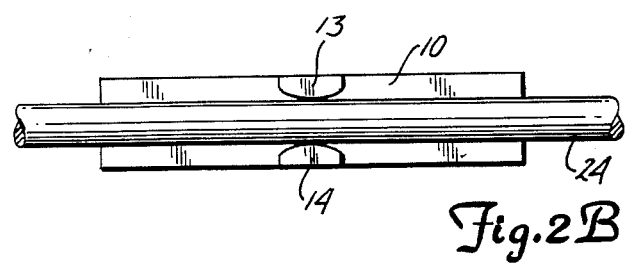

PROCESS FOR PRODUCING HIGH PRECISION APERTURES IN PLASTIC COMPONENTS

BACKGROUND

The invention comprises a process for forming high precision apertures in plastic components. In the presently preferred embodiment, the invention is applied to the fabrication of the tang and bore holes of a magnetic transducer positioning carriage for a magnetic disk drive assembly.

Magnetic transducer supporting carriages travel along polished guide rods which slide through the tang and bore holes of the carriage. In order to insure accurate head positioning, the tang and bore hole dimensions must be very precise. Sideplay between the carriage and the rods must be held to very tight tolerances. The bore holes must also be precisely aligned to avoid undue friction. Too much sideplay, or misalignment between the bore holes, not only causes errors in head positioning but also contributes to audible noise which is very unacceptable. Imprecise fabrication of the tang also produces excessive friction and noise.

In the past, two methods have been used to form the tang and bore holes of a carriage: molding and machining. Molding has proved to be incapable of providing the tight tolerances required due to shrinkage and wharpage. Machining has also proved to be unacceptable in that fiber reinforced compositions are used for the carriages such as polycarbonate reinforced with glass or carbons fibers. Attempts at boring carriages of this composition have yielded only very rough holes since the tool cannot cut smoothly as it encounters very wide variations in stiffness as it passes alternatively through the polymer and the fibers.

SUMMARY

The invention comprises a process for forming apertures in plastic components which avoids the shortcomings of the prior art techniques. In the preferred embodiment, the invention is applied in fabricating the tang and bore holes of a magnetic head supporting carriage. Whereas the polymers used in the past for carriage fabrication have been amorphous, having no crystalline structure; according to the present invention, the carriage is molded from a fiber reinforced crystalline, or semicrystalline, thermoplastic material such as polyphenylene sulfide (PPS). The tang and bore holes are formed in the carriage during the injection molding step. A slightly oversized annealing rod having a circular cross-section is inserted through the bore holes, and a second annealing rod, having a square cross-section, is inserted between the oppositely disposed members of the tang. The carriage is then stress-relieved through an oven annealing process with the annealing rods in place in the bore holes and tang. The carriage is removed from the oven and cooled, and the annealing rods are withdrawn once the carriage has reached room temperature with the result that the tang is precisely dimensioned and the bore holes are nearly perfectly dimensioned and aligned. Moreover, since annealing is a process of recrystallation and subsequent stress relieving, the geometry of the bore holes and tang are very stable and will not appreciably change with time. Consequently, aperture misalignment, excessive sideplay, and other problems of the prior art are eliminated.

The invention is not limited to use with PPS but could also be employed with other crystalline or semicrystalline thermoplastic materials. Moreover, whereas it is especially advantageous to apply the process to the fabrication of the bore holes and tang of a magnetic transducer supporting carriage, the invention is applicable to any situation wherein a highly accurate aperture must be formed in a plastic component.

BRIEF DESCRIPTION OF THE FIGURES

FIG. 1 shows a plan view of a transducer positioning carriage mounted for translation on guide rods.

FIG. 2A shows a cross-sectional view taken along line 2A—2A of FIG. 1.

FIG. 2B shows an elevational view taken along line 2B—2B of FIG. 2A.

FIG. 3 shows an elevational view of the carriage 10 vertically installed on the annealing fixture 50.

FIG. 4 shows a cross-sectional view taken along line 4—4 of FIG. 3.

DESCRIPTION OF PRESENTLY PREFERRED EMBODIMENT

The process comprising the present invention, while it can be employed for forming highly accurate apertures in plastic components, is especially advantageous for use in forming the bore holes and tang of a magnetic transducer supporting carriage.

Consequently, FIGS. 1, 2A and 2B show a simplified transducer supporting carriage 10, having a tang 12, comprised of an upper member 13 and a lower member 14 and a pair of aligned bore holes 16 and 18. A guide rod 20 extends through the bore holes 16, 18 while another guide rod 24 extends between the tang members 13, 14. Guide rod 20 has a diameter which is slightly smaller than the aperture 16, 18. Tang members 13, 14 are convexly shaped and displsed on opposite sides of rod 24 as is best shown in FIG. 2B. Carriage 10 is moveable along the rods 20, 24 in a rectilinear fashion by means of a translation mechanism (not shown). The translation mechanism would, for example, be a stepper motor. An arm 30, supporting a magnetic read/write transducer 35, laterally projects from carriage 10. Transducer 35 reads and/or writes on a rotating magnetic disk 40 in the conventional fashion.

Having described the basic environment of the transducer translating carriage 10, the process according to which the tang 12 and bore holes 16 and 18 are formed in practicing the present invention will now be described.

The carriage 10 is first injection molded using a crystalline or semicrystalline material, preferably polyphenylene sulfide (PPS). The structure and composition of PPS is described in U.S. Pat. No. 3,878,113 which is hereby incorporated by reference. The basic PPS resin is made by Phillips Petroleum. This PPS resin is compounded with various filler materials to modify the properties of the resultant composition. In the presently preferred embodiment, the material used in RTP Company's RTP 1307 TFF 10. This translates to 40 percent fiberglass, 10 percent PTFE fibers and 50 percent PPS. The bore holes 16, 18 are formed during the injection molding step by two pins which are part of the injection die, but due to shrinkage and wharpage their dimensions do not hold true. Following the molding step, the carriage 10 is installed vertically on the annealing fixture 50 which is shown in FIG. 3. Fixture 50 has a base 52 and vertically projecting annealing rods 54, 58. Annealing rod 54 has a circular cross-section and an oversized diameter with respect to the bore holes 16, 18 so that when the carriage is installed on the fixture, a slight force fit relationship is present between annealing rod 54 and the bore holes 16, 18. Annealing rod 58 has a rectangular cross section and is inserted between the members 13, 14 of tang 12 so that they are elastically deflected outwardly slightly. See FIG. 4. The carriage 10 installed on the fixture 50 as described, is then placed in an annealing oven at an elevated temperature of between 275° F.–500° F. (approximately) for a period of time of 1–4 hours (approximately) depending on component thickness and temperature. During this annealing step the carriage material goes through a recrystallation especially in the vicinity of the bore holes and tang to conform to the annealing rods. The carriage 10 is then taken out of the annealing oven and air cooled by natural convection for about 30 minutes. Once carriage 10 reaches room temperature it is removed from the fixture 50. During this process, the crystalline structure of the carriage undergoes an amount of stress relieving such that the carriage geometry becomes very stable. While the annealing rods 59, 58 are in place, the carriage material deforms elastically, but with the rods removed, both the tang 12 and bore holes 16, 18 relax to their nominal state wherein their dimensions are very accurate and stable.

In experiments carried out to demostrate the workability of the present invention, bore hole diameter before annealing was approximately 0.1870 inch. Bore misalignment was high as 0.007 inch. The desired resulting bore (to minimize sideplay while permitting carriage translation) is 0.1875 plus 0.0002, minus 0.0000. Consequently, a 0.1879 inch diameter annealing rod was used in that the annealing process produces a bore slightly smaller (on the order of 0.0003 inch) than the annealing rod as described.

An especially important aspect of the invention is that the annealing rod 58 precisely aligns the bores 16, 18 during the annealing and cooling steps so that bore alignment is improved. It is also especially noteworthy that the surface finish of the bore holes 16, 18 is exceptional; better than molded and far better than machined. Consequently, once carriage 10 is installed on upon the guide rods 20, 24, it can be reciprocally translated with a minimum of frictional forces being generated, and therefore, with a high degree of accuracy. Reduction of friction helps to reduce hysteresis. Undesirable sideplay between the guide rod 20 and bore holes 16, 18 is minimized to minimize errors in head/track positioning. In addition, since sideplay and friction contribute to audible noise, carriages fabricated according to the process of the present invention are far quieter than those of the prior art. As noted, though the invention has particular advantages when applied to the fabrication of the tang and bore holes in a magnetic transducer positioning carriage, it is not limited to the magnetic recording art and has application to any situation wherein a high precision aperture is to be formed in a plastic component. Furthermore, as noted, the invention is not limited to use with PPS, and other semicrystalline or crystalline thermoplastic materials could be used.

Having disclosed the presently preferred embodiment of the invention, many modifications and variations thereof will be obvious to those skilled in the art, and the invention, therefore, is intended to be limited only by the scope of the appended claims.

We claim:

1. A process for forming and aligning a pair of precisely dimensioned apertures in a plastic component consisting of a carriage for supporting a magnetic transducer for reading and/or writing on a magnetic disk having a pair of apertures in alignment which are bore holes to be used for sliding on a guide rod in an operative structure, comprising the steps of:
   (a) injection molding the carriage from a composition which includes a crystalline or semicrystalline material during a molding step, said carriage having said apertures partially formed therein during said molding step;
   (b) inserting an oversized annealing rod into said apertures during an inserting step; wherein said annealing rod is oversized with respect to both of said apertures, and said rod is inserted into and extends through both of said apertures prior to said annealing step, thereby causing said annealing rod to finally align and form said apertures with respect to each other;
   (c) placing said carriage, with said annealing rod installed in said apertures, in an oven at an elevated temperature for a period of time during an annealing step; and
   (c-1) Cooling said carriage with said annealing rod in said apertures;
   (d) removing said annealing rod from said apertures during a removal step.

2. The process of claim 1 wherein said carriage also includes a tang comprised of oppositely disposed upper and lower members, and wherein a second annealing rod has a rectangular cross-section and is frictionally inserted between said members of said tang during said annealing step.

3. The process of claim 2 wherein said first and second annealing rods are supported by a base, said first and second annealing rods and said base comprising an annealing fixture.

4. The process of claim 1 wherein said crystalline, or semicrystalline, material includes polyphenylene sulfide.

* * * * *